United States Patent
Pu et al.

(10) Patent No.: US 9,891,313 B2
(45) Date of Patent: Feb. 13, 2018

(54) RADAR DEVICE AND SECURITY MONITORING SYSTEM

(71) Applicant: HTC Corporation, Taoyuan (TW)

(72) Inventors: Ta-Chun Pu, Taoyuan (TW); Chun-Yih Wu, Taoyuan (TW); Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 437 days.

(21) Appl. No.: 14/707,798

(22) Filed: May 8, 2015

(65) Prior Publication Data

US 2016/0327644 A1 Nov. 10, 2016

(51) Int. Cl.
*G01S 13/00* (2006.01)
*G01S 13/88* (2006.01)
*G01S 7/02* (2006.01)
*G01S 13/58* (2006.01)

(52) U.S. Cl.
CPC ............. *G01S 13/88* (2013.01); *G01S 7/025* (2013.01); *G01S 7/026* (2013.01); *G01S 13/58* (2013.01)

(58) Field of Classification Search
CPC .......... G01S 13/00; G01S 13/88; G01S 7/025; G01S 7/026; G01S 13/58
USPC ......................................................... 342/21
See application file for complete search history.

(56) References Cited

U.S. PATENT DOCUMENTS

| | | | | |
|---|---|---|---|---|
| 4,777,654 | A * | 10/1988 | Conti ..................... | G01S 7/025 455/327 |
| 7,176,830 | B2 * | 2/2007 | Horibe .................. | G01S 17/023 342/118 |
| 7,209,089 | B2 * | 4/2007 | Schantz ................. | H01Q 13/10 343/787 |
| 8,393,443 | B2 * | 3/2013 | Evans ..................... | B60L 7/28 180/65.1 |
| 9,581,683 | B2 * | 2/2017 | Choi ...................... | G01S 7/4056 |
| 9,603,555 | B2 * | 3/2017 | Horng .................... | A61B 5/113 |
| 9,671,492 | B2 * | 6/2017 | Diewald ................. | G01S 13/56 |
| 2005/0073424 | A1 * | 4/2005 | Ruoss .................... | A61B 5/0507 340/686.6 |
| 2005/0225476 | A1 * | 10/2005 | Hoetzel ................. | G01S 13/24 342/70 |
| 2006/0065779 | A1 * | 3/2006 | McCoskey .............. | B64F 1/32 244/100 R |

(Continued)

FOREIGN PATENT DOCUMENTS

CN 202026994 U 11/2011
EP 2082939 A2 * 7/2009 .......... B60W 40/068

(Continued)

*Primary Examiner* — Harry K Liu
(74) *Attorney, Agent, or Firm* — Birch, Stewart, Kolasch & Birch, LLP

(57) ABSTRACT

A radar device for detecting an OUD (Object Under Detection) includes a signal source, a first antenna, a second antenna, a mixer, and a 90-degree coupler. The signal source is configured to generate an incident signal. The first antenna is configured to transmit the incident signal to the OUD. The second antenna is configured to receive a reflective signal from the OUD. The mixer is configured to generate a baseband signal according to the incident signal and the reflective signal. The second antenna is coupled through the 90-degree coupler to the mixer, or the signal source is coupled through the 90-degree coupler to the first antenna.

18 Claims, 6 Drawing Sheets

(56) References Cited

U.S. PATENT DOCUMENTS

2012/0105276 A1* 5/2012 Ryland ................ G01S 13/9035
                                                    342/25 F
2014/0266866 A1* 9/2014 Swirhun ................ G01S 7/026
                                                    342/188
2014/0318879 A1* 10/2014 Gillett ................ B60K 7/0007
                                                    180/167
2016/0299215 A1* 10/2016 Dandu ................ G01S 7/4008

FOREIGN PATENT DOCUMENTS

| EP | 1791609 B1 | 11/2011 |
|----|------------|---------|
| TW | 373153 | 11/1999 |
| TW | 201106640 A1 | 2/2011 |
| TW | 201212904 A1 | 4/2012 |
| TW | 201401855 A | 1/2014 |
| TW | 201436766 A | 10/2014 |
| WO | 2014/150908 A1 | 9/2014 |

* cited by examiner

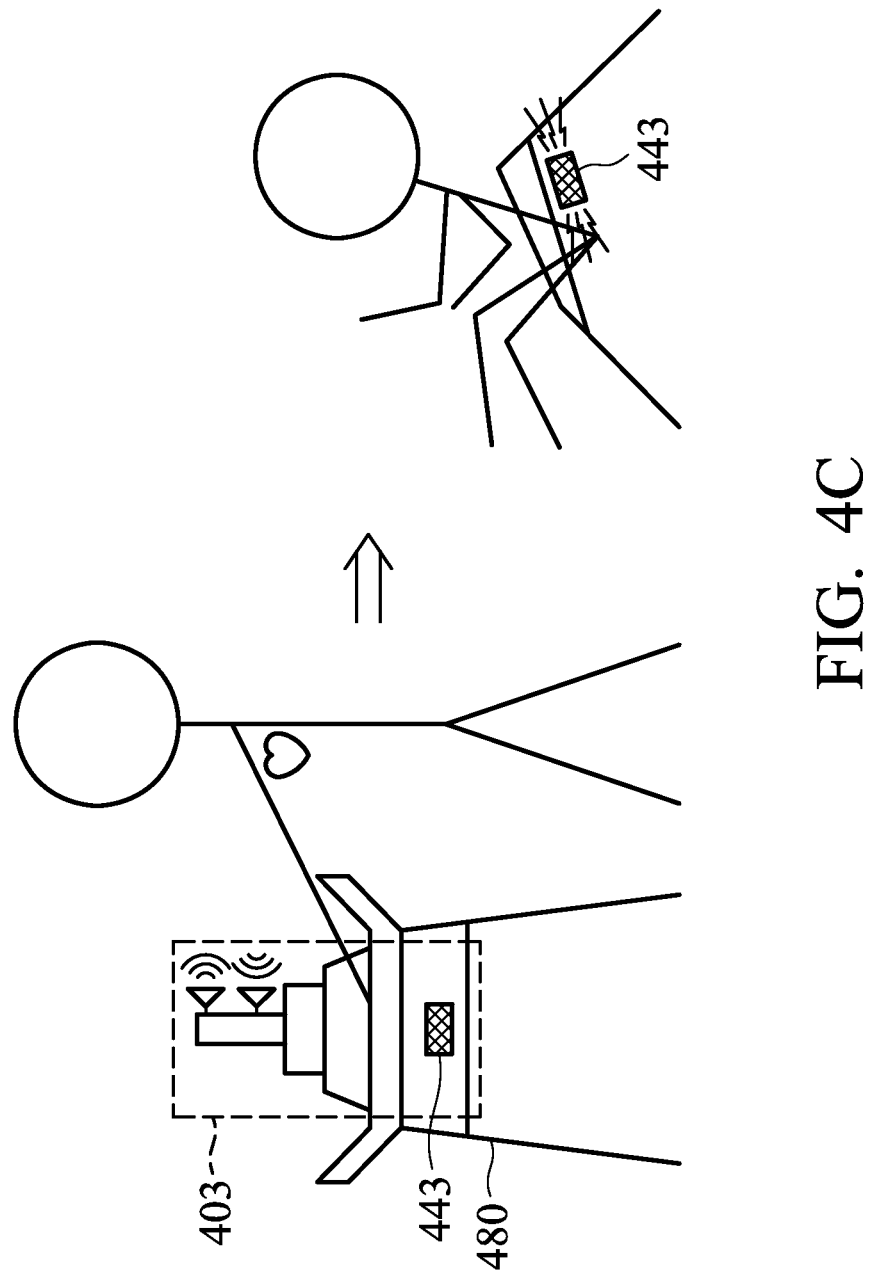

RADAR DEVICE AND SECURITY MONITORING SYSTEM

BACKGROUND OF THE INVENTION

Field of the Invention

The subject application generally relates to a radar device, and more specifically, to a radar device and a security monitoring system for protecting a user.

Description of the Related Art

A conventional radar generally has a design of I/Q (In-phase/Quadrature) two orthogonal signal paths, in order to solve the problem of detection nulls. However, if the I/Q orthogonal signal paths are used to deliver signals, at least two mixers should be designed and integrated with the I/Q paths, and they will occupy a greater substrate area and increase the total manufacturing costs thereof. Accordingly, there is a need to design a novel radar device to overcome the drawbacks of the prior art.

BRIEF SUMMARY OF THE INVENTION

In a preferred embodiment, the subject application is directed to a radar device for detecting an OUD (Object Under Detection). The radar device includes a signal source, a first antenna, a second antenna, a mixer, and a 90-degree coupler. The signal source generates an incident signal. The first antenna transmits the incident signal to the OUD. The second antenna receives a reflective signal from the OUD. The mixer generates a baseband signal according to the incident signal and the reflective signal. The second antenna is coupled through the 90-degree coupler to the mixer, or the signal source is coupled through the 90-degree coupler to the first antenna.

In some embodiments, the radar device is a Doppler radar, and the baseband signal includes a speed information of the OUD.

In some embodiments, the 90-degree coupler has a first input terminal, a second input terminal, a first output terminal, and a second output terminal. The signals input to the first input terminal or the second input terminal are divided into two portions and are respectively output from the first output terminal and the second output terminal. The signal phase difference between the first output terminal and the second output terminal is 90 degrees.

In some embodiments, the first input terminal of the 90-degree coupler is coupled to the second antenna, the second input terminal of the 90-degree coupler is coupled through a matching resistor to a ground voltage, and the first output terminal and the second output terminal of the 90-degree coupler are coupled to the mixer.

In some embodiments, the first input terminal and the second input terminal of the 90-degree coupler are coupled to the second antenna, and the first output terminal and the second output terminal of the 90-degree coupler are coupled to the mixer.

In some embodiments, the first input terminal of the 90-degree coupler is coupled to the signal source, the second input terminal of the 90-degree coupler is coupled through a matching resistor to a ground voltage, and the first output terminal and the second output terminal of the 90-degree coupler are coupled to the first antenna.

In some embodiments, the first input terminal and the second input terminal of the 90-degree coupler are coupled to the signal source, and the first output terminal and the second output terminal of the 90-degree coupler are coupled to the first antenna.

In a preferred embodiment, the subject application is directed to a radar device for detecting an OUD (Object Under Detection). The radar device includes a signal source, a first antenna, a second antenna, and a mixer. The signal source generates an incident signal. The first antenna transmits the incident signal to the OUD. The second antenna receives a reflective signal from the OUD. The mixer generates a baseband signal according to the incident signal and the reflective signal. The first antenna is a circular polarization antenna and the second antenna is a linear polarization antenna, or the first antenna is a linear polarization antenna and the second antenna is a circular polarization antenna.

In some embodiments, the signals transmitted or received by the circular polarization antenna have orthogonal polarization directions and phase differences of 90 degrees.

In some embodiments, the signals transmitted or received by the linear polarization antenna have orthogonal polarization directions and phase differences of 0 degrees.

In a preferred embodiment, the subject application is directed to a security monitoring system for protecting a user. The security monitoring system includes a radar device, a signal processor, a reactive element, and a controller. The radar device detects the state of the user, and generates a baseband signal. The signal processor analyzes the baseband signal, and generates a control signal. The controller operates the reactive element according to the control signal, so as to protect safety of the user.

In some embodiments, the reactive element is a wheel motor.

In some embodiments, when it is detected that the moving speed of the user decreases, the controller decreases a rotational speed of the wheel motor. When it is detected that the moving speed of the user increases, the controller increases the rotational speed of the wheel motor.

In some embodiments, the reactive element is an inflatable cushion.

In some embodiments, when it is detected that the user has fallen, the controller controls the inflatable cushion to be filled with air immediately, so as to support the user.

In some embodiments, the reactive element is an alarm element.

In some embodiments, when it is detected that the user has fallen, the controller controls the alarm element to generate flashing lights and sound.

In some embodiments, the radar device includes a signal source, a first antenna, a second antenna, a mixer, and a 90-degree coupler. The signal source generates an incident signal. The first antenna transmits the incident signal to the user. The second antenna receives a reflective signal from the user. The mixer generates the baseband signal according to the incident signal and the reflective signal. The second antenna is coupled through the 90-degree coupler to the mixer, or the signal source is coupled through the 90-degree coupler to the first antenna.

In some embodiments, the radar device includes a signal source, a first antenna, a second antenna, and a mixer. The signal source generates an incident signal. The first antenna transmits the incident signal to the user. The second antenna receives a reflective signal from the user. The mixer generates the baseband signal according to the incident signal and the reflective signal. The first antenna is a circular polarization antenna and the second antenna is a linear polarization antenna, or the first antenna is a linear polarization antenna and the second antenna is a circular polarization antenna.

BRIEF DESCRIPTION OF DRAWINGS

The subject application can be more fully understood by reading the subsequent detailed description and examples with references made to the accompanying drawings, wherein:

FIG. 4C is a diagram of an application of a security monitoring system according to an embodiment of the subject application.

DETAILED DESCRIPTION OF THE INVENTION

In order to illustrate the purposes, features and advantages of the subject application, the embodiments and figures of the subject application are shown in detail as follows.

Figure 1A:
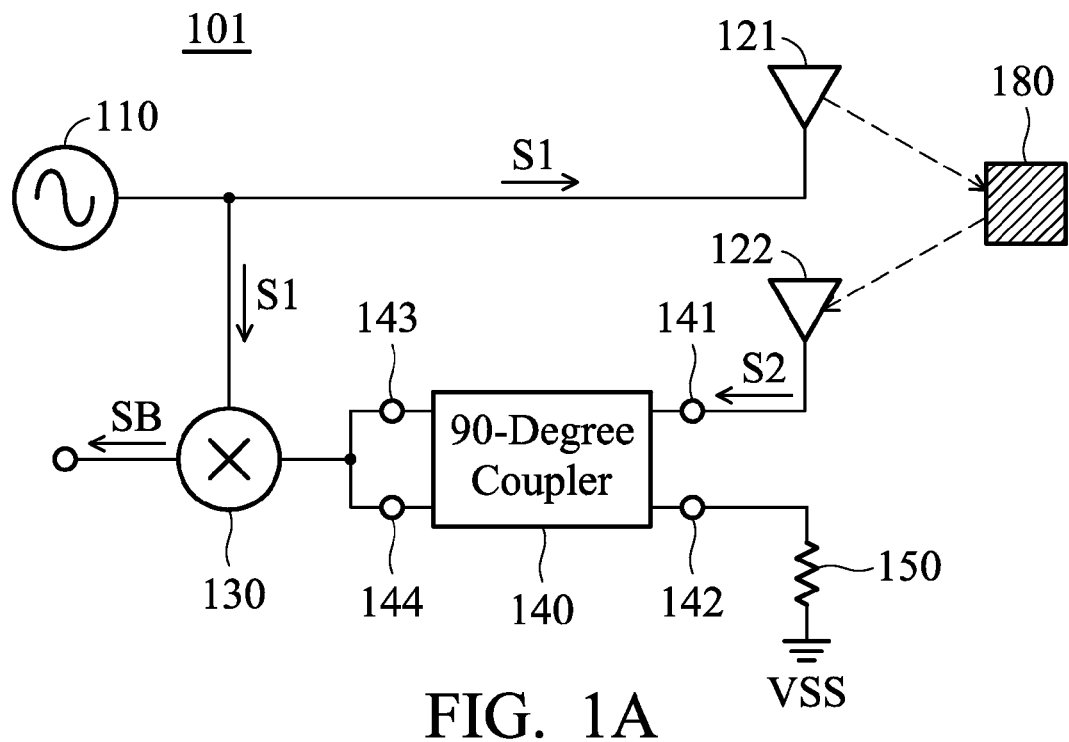
FIG. 1A is a diagram of a radar device according to an embodiment of the subject application.

FIG. 1A is a diagram of a radar device 101 according to an embodiment of the subject application. The radar device 101 can detect the state of an OUD (Object Under Detection) 180, such as the displacement, speed, or acceleration. As shown in FIG. 1A, the radar device 101 includes a signal source 110, a first antenna 121, a second antenna 122, a mixer 130, and a 90-degree coupler 140. The signal source 110 may be a sinusoidal oscillator. The first antenna 121 and the second antenna 122 may be any type of antennas, such as monopole antennas, dipole antennas, loop antennas, circular polarization antennas, elliptical polarization antennas, or helical antennas. The mixer 130 multiplies its input signals in the time domain and outputs the product of the signals. The 90-degree coupler 140 has a first input terminal 141, a second input terminal 142, a first output terminal 143, and a second output terminal 144. The signals input to the first input terminal 141 or the second input terminal 142 are divided into two portions and are respectively output from the first output terminal 143 and the second output terminal 144. The signal phase difference between the first output terminal 143 and the second output terminal 144 is 90 degrees.

The following embodiments of FIGS. 1A to 1D describe different configurations of the proposed radar device, in which conventional I/Q signal paths with at least two mixers are replaced with a 90-degree coupler 140. It should be understood that these embodiments are merely exemplary, rather than limitations of the subject application.

In the embodiment of FIG. 1A, the signal source 110 generates an incident signal S1. The first antenna 121 transmits the incident signal S1 to the OUD 180. The second antenna 122 receives a reflective signal S2 from the OUD 180. The second antenna 122 is coupled through the 90-degree coupler 140 to the mixer 130. The 90-degree coupler 140 divides the reflective signal S2 and adjusts the phase of the reflective signal S2. The mixer 130 generates a baseband signal SB according to the incident signal S1 and the reflective signal S2. The radar device 101 may be a Doppler radar, and the baseband signal SB may include the speed information of the OUD 180. Specifically, the first input terminal 141 of the 90-degree coupler 140 is coupled to the second antenna 122, the second input terminal 142 of the 90-degree coupler 140 is coupled through a matching resistor 150 to a ground voltage VSS, and the first output terminal 143 and the second output terminal 144 of the 90-degree coupler 140 are coupled to the mixer 130. With such a design, the mixer 130 receives two divided portions of the reflective signal S2 from the 90-degree coupler 140. The divided portions of the reflective signal S2 have a signal phase difference of 90 degrees therebetween, and they are similar to conventional I/Q two orthogonal signals. Therefore, the radar device 101 of FIG. 1A can implement two transmission paths of orthogonal signals, without using a secondary mixer. In comparison to the prior art, the subject application has at least the advantages of simplifying the design and reducing the manufacturing costs, and it is suitable for application in a variety of radar detection fields.

Figure 1B:
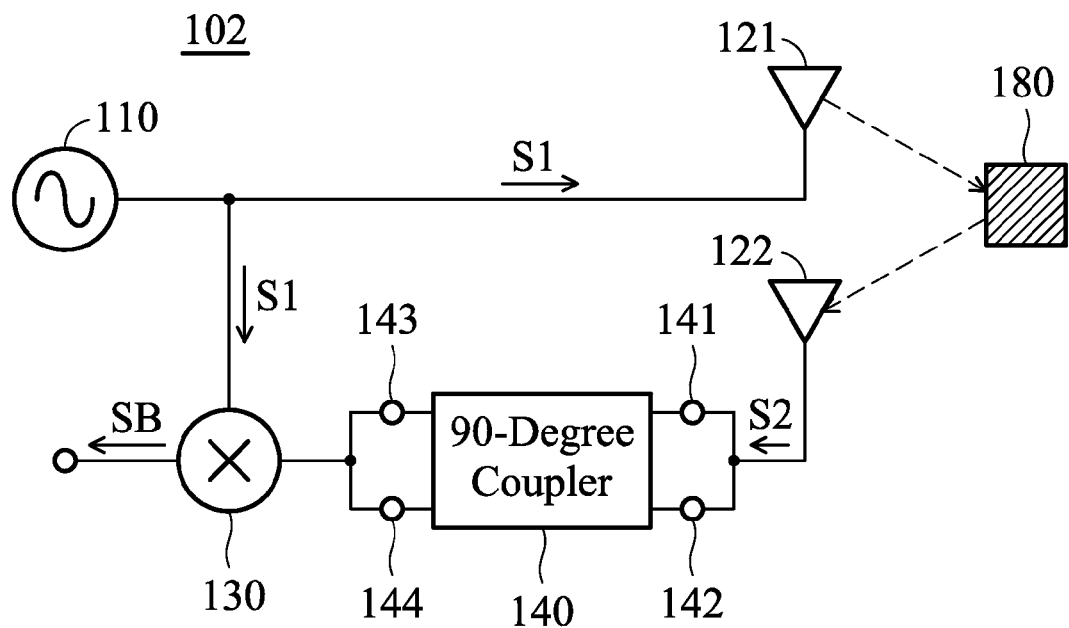
FIG. 1B is a diagram of a radar device according to an embodiment of the subject application.

FIG. 1B is a diagram of a radar device 102 according to an embodiment of the subject application. FIG. 1B is similar to FIG. 1A. In the embodiment of FIG. 1B, the signal source 110 generates an incident signal S1. The first antenna 121 transmits the incident signal S1 to the OUD 180. The second antenna 122 receives a reflective signal S2 from the OUD 180. The second antenna 122 is coupled through the 90-degree coupler 140 to the mixer 130. The 90-degree coupler 140 divides the reflective signal S2 and adjusts the phase of the reflective signal S2. The mixer 130 generates a baseband signal SB according to the incident signal S1 and the reflective signal S2. Specifically, the first input terminal 141 and the second input terminal 142 of the 90-degree coupler 140 are coupled to the second antenna 122, and the first output terminal 143 and the second output terminal 144 of the 90-degree coupler 140 are coupled to the mixer 130. With such a design, the mixer 130 receives two divided portions of the reflective signal S2 from the 90-degree coupler 140. The divided portions of the reflective signal S2 have a signal phase difference of 90 degrees therebetween, and they are similar to conventional I/Q two orthogonal signals. Other features of the radar device 102 of FIG. 1B are similar to those of the radar device 101 of FIG. 1A. As a result, the two embodiments can achieve similar levels of performance.

Figure 1C:
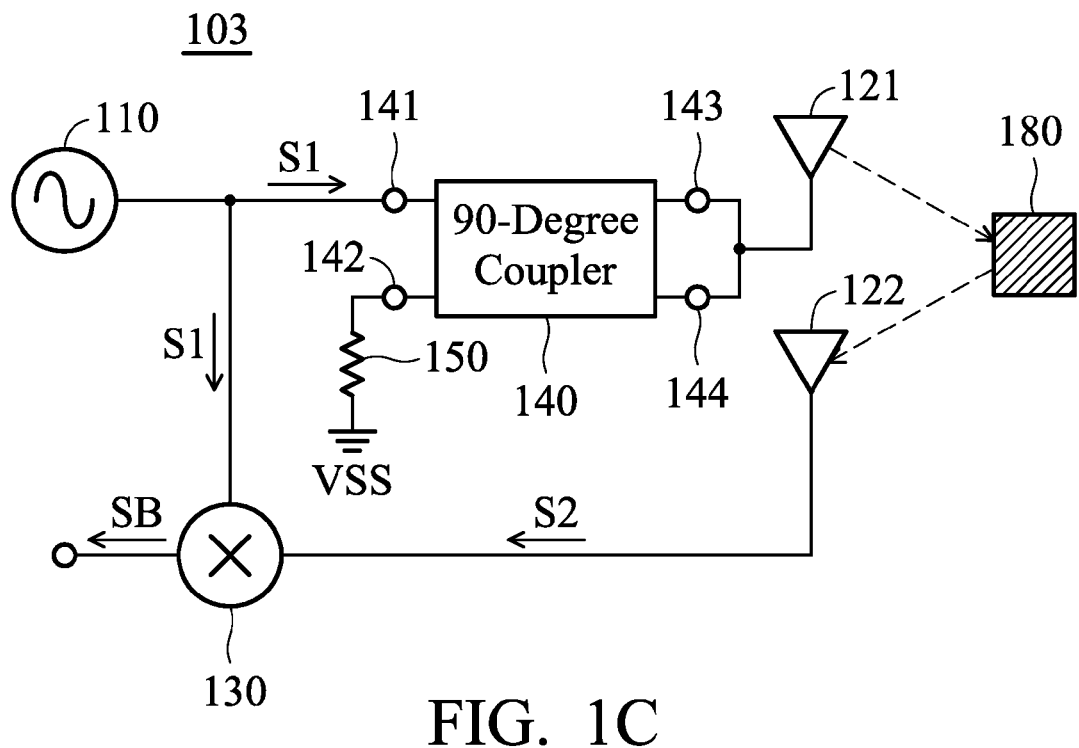
FIG. 1C is a diagram of a radar device according to an embodiment of the subject application.

FIG. 1C is a diagram of a radar device 103 according to an embodiment of the subject application. FIG. 1C is similar to FIG. 1A. In the embodiment of FIG. 1C, the signal source 110 generates an incident signal S1. The signal source 110 is coupled through the 90-degree coupler 140 to the first antenna 121. The 90-degree coupler 140 divides the incident signal S1 and adjusts the phase of the incident signal S1. The first antenna 121 transmits the incident signal S1 to the OUD 180. The second antenna 122 receives a reflective signal S2 from the OUD 180. The mixer 130 generates a baseband signal SB according to the incident signal S1 and the reflective signal S2. Specifically, the first input terminal 141 of the 90-degree coupler 140 is coupled to the signal source 110, the second input terminal 142 of the 90-degree coupler 140 is coupled through a matching resistor 150 to a ground voltage VSS, and the first output terminal 143 and the second output terminal 144 of the 90-degree coupler 140 are coupled to the first antenna 121. With such a design, the first antenna 121 transmits two divided portions of the incident signal S1 from the 90-degree coupler 140. The divided portions of the incident signal S1 have a signal phase difference of 90 degrees therebetween, and they are similar to conventional I/Q two orthogonal signals. Other features of the radar device 103 of FIG. 1C are similar to those of the radar device 101 of FIG. 1A. As a result, the two embodiments can achieve similar levels of performance.

Figure 1D:
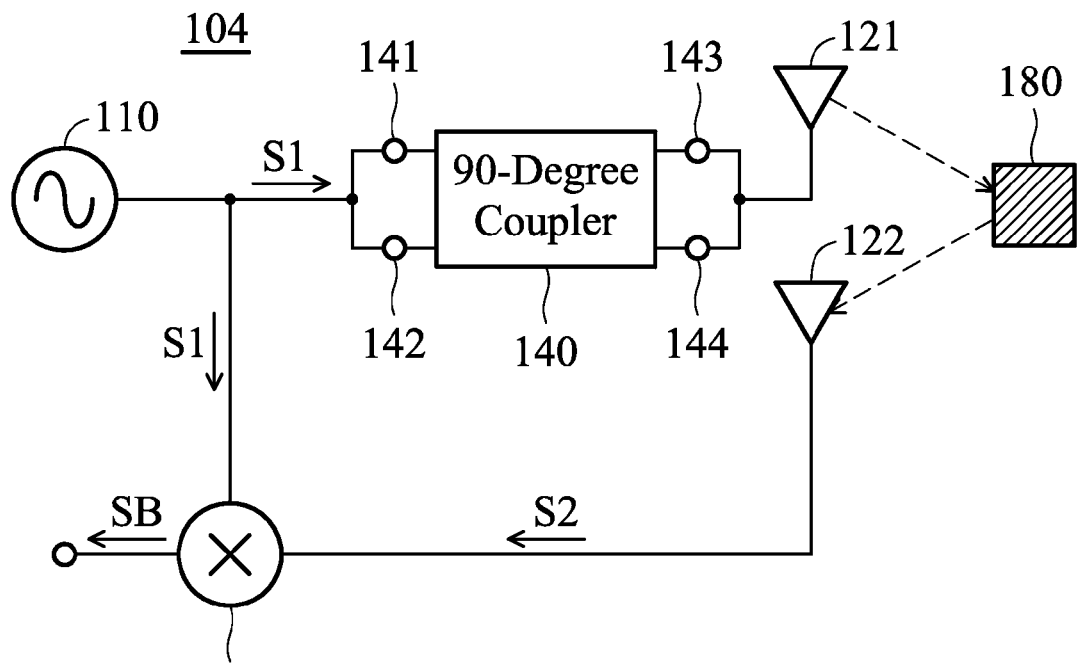
FIG. 1D is a diagram of a radar device according to an embodiment of the subject application.

FIG. 1D is a diagram of a radar device 104 according to an embodiment of the subject application. FIG. 1D is similar to FIG. 1A. In the embodiment of FIG. 1D, the signal source 110 generates an incident signal S1. The signal source 110 is coupled through the 90-degree coupler 140 to the first antenna 121. The 90-degree coupler 140 divides the incident signal S1 and adjusts the phase of the incident signal S1. The first antenna 121 transmits the incident signal S1 to the OUD 180. The second antenna 122 receives a reflective signal S2 from the OUD 180. The mixer 130 generates a baseband signal SB according to the incident signal S1 and the reflective signal S2. Specifically, the first input terminal 141 and the second input terminal 142 of the 90-degree coupler 140 are coupled to the signal source 110, and the first output terminal 143 and the second output terminal 144 of the 90-degree coupler 140 are coupled to the first antenna 121. With such a design, the first antenna 121 transmits two divided portions of the incident signal S1 from the 90-degree coupler 140. The divided portions of the incident signal S1 have a signal phase difference of 90 degrees therebetween, and they are similar to conventional I/Q two orthogonal signals. Other features of the radar device 104 of FIG. 1D are similar to those of the radar device 101 of FIG. 1A. As a result, the two embodiments can achieve similar levels of performance.

Figure 2A:
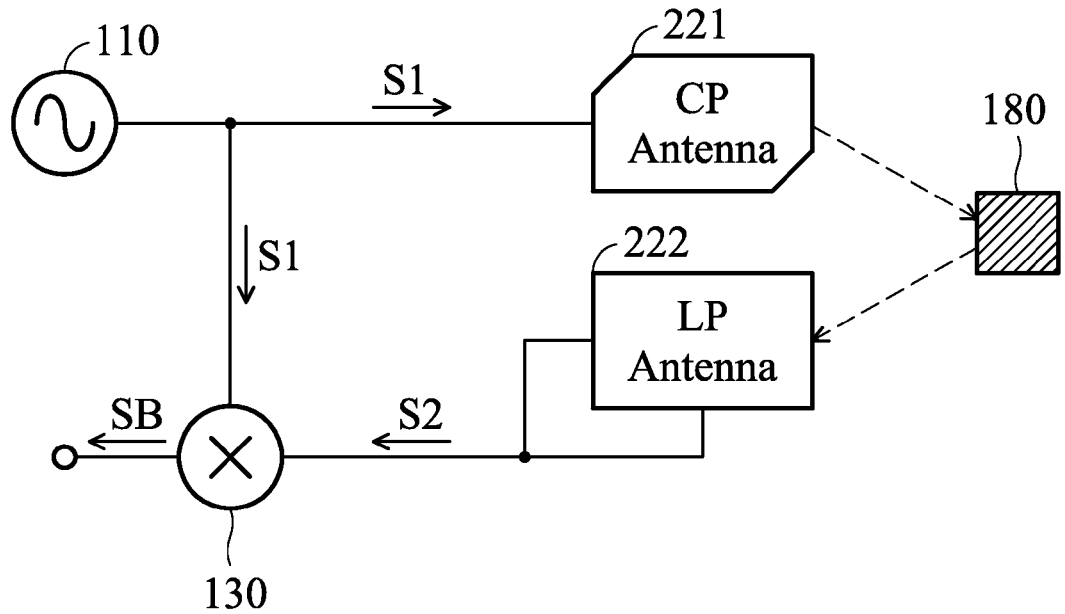
FIG. 2A is a diagram of a radar device according to an embodiment of the subject application.

FIG. 2A is a diagram of a radar device 201 according to an embodiment of the subject application. The radar device 201 can detect the state of an OUD 180, such as the displacement, speed, or acceleration. As shown in FIG. 2A, the radar device 201 includes a signal source 110, a first antenna 221, a second antenna 222, and a mixer 130. The signal source 110 may be a sinusoidal oscillator. One of the first antenna 221 and the second antenna 222 is a circular polarization (CP) antenna, and the other of the first antenna 221 and the second antenna 222 is a linear polarization (LP) antenna. The mixer 130 multiplies its input signals in the time domain and outputs the product of the signals.

Figure 2B:
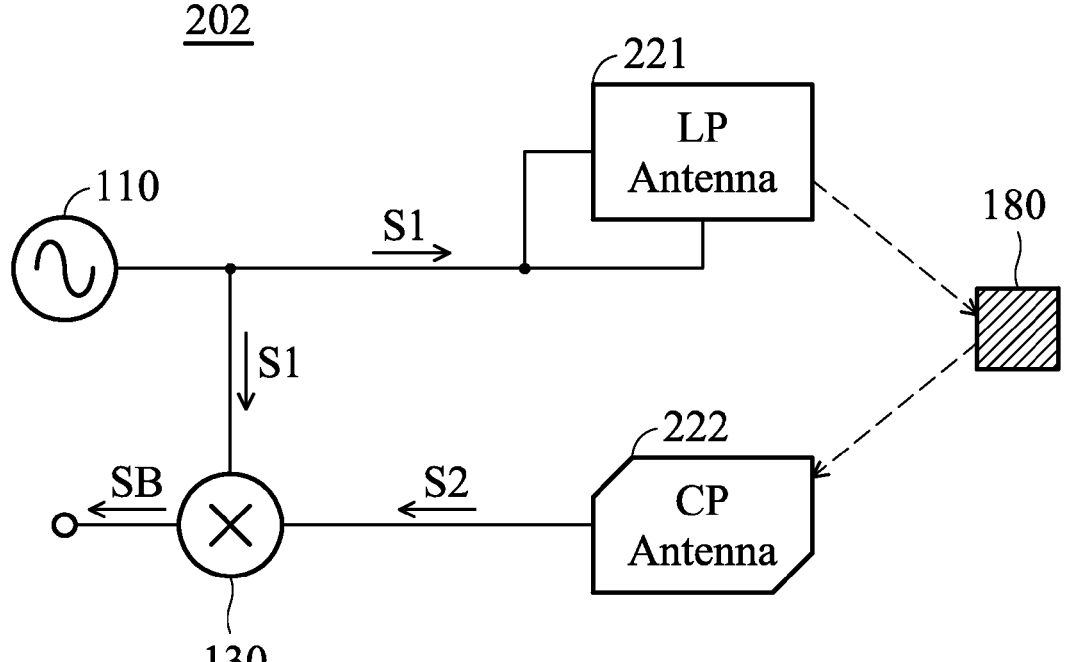
FIG. 2B is a diagram of a radar device according to an embodiment of the subject application.

The following embodiments of FIGS. 2A to 2B describe different configurations of the proposed radar device, in which the conventional I/Q signal paths with at least two mixers are replaced with a circular polarization antenna and a linear polarization antenna. It should be understood that these embodiments are merely exemplary, rather than limitations of the subject application.

In the embodiment of FIG. 2A, the first antenna 221 is a circular polarization antenna, and the second antenna 222 is a linear polarization antenna. The signal source 110 generates an incident signal S1. The first antenna 221 transmits the incident signal S1 to the OUD 180. The second antenna 222 receives a reflective signal S2 from the OUD 180. The second antenna 222 may be a two-port orthogonal linear polarization antenna, or may include two one-port linear polarization antennas which are disposed perpendicular to each other. The mixer 130 generates a baseband signal SB according to the incident signal S1 and the reflective signal S2. The radar device 201 may be a Doppler radar, and the baseband signal SB may include the speed information of the OUD 180. Specifically, the signals transmitted by the first antenna 221 (i.e., the circular polarization antenna) have orthogonal polarization directions and phase differences of 90 degrees (e.g., the first antenna 221 may transmit an X-directional polarization signal and a Y-directional polarization signal, and their signal phase difference may be 90 degrees), and the signals received by the second antenna 222 (i.e., the linear polarization antenna) have orthogonal polarization directions and phase differences of 0 degrees (e.g., the second antenna 222 may receive an X-directional polarization signal and a Y-directional polarization signal, and their signal phase difference may be 0 degrees). Such a design is similar to conventional I/Q two orthogonal signals. Therefore, the radar device 201 of FIG. 2A can implement two transmission paths of orthogonal signals, without using a secondary mixer. In comparison to the prior art, the subject application has at least the advantages of simplifying the design and reducing the manufacturing costs, and it is suitable for application in a variety of radar detection fields.

FIG. 2B is a diagram of a radar device 202 according to an embodiment of the subject application. FIG. 2B is similar to FIG. 2A. In the embodiment of FIG. 2B, the first antenna 221 is a linear polarization antenna, and the second antenna 222 is a circular polarization antenna. The signal source 110 generates an incident signal S1. The first antenna 221 transmits the incident signal S1 to the OUD 180. The second antenna 222 receives a reflective signal S2 from the OUD 180. The first antenna 221 may be a two-port orthogonal linear polarization antenna, or may include two one-port linear polarization antennas which are disposed perpendicular to each other. The mixer 130 generates a baseband signal SB according to the incident signal S1 and the reflective signal S2. Specifically, and the signals transmitted by the first antenna 221 (i.e., the linear polarization antenna) have orthogonal polarization directions and phase differences of 0 degrees (e.g., the first antenna 221 may transmit an X-directional polarization signal and a Y-directional polarization signal, and their signal phase difference may be 0 degrees), and the signals received by the second antenna 222 (i.e., the circular polarization antenna) have orthogonal polarization directions and phase differences of 90 degrees (e.g., the second antenna 222 may receive an X-directional polarization signal and a Y-directional polarization signal, and their signal phase difference may be 90 degrees). Such a design is similar to conventional I/Q two orthogonal signals. Other features of the radar device 202 of FIG. 2B are similar to those of the radar device 201 of FIG. 2A. As a result, the two embodiments can achieve similar levels of performance.

Figure 3:
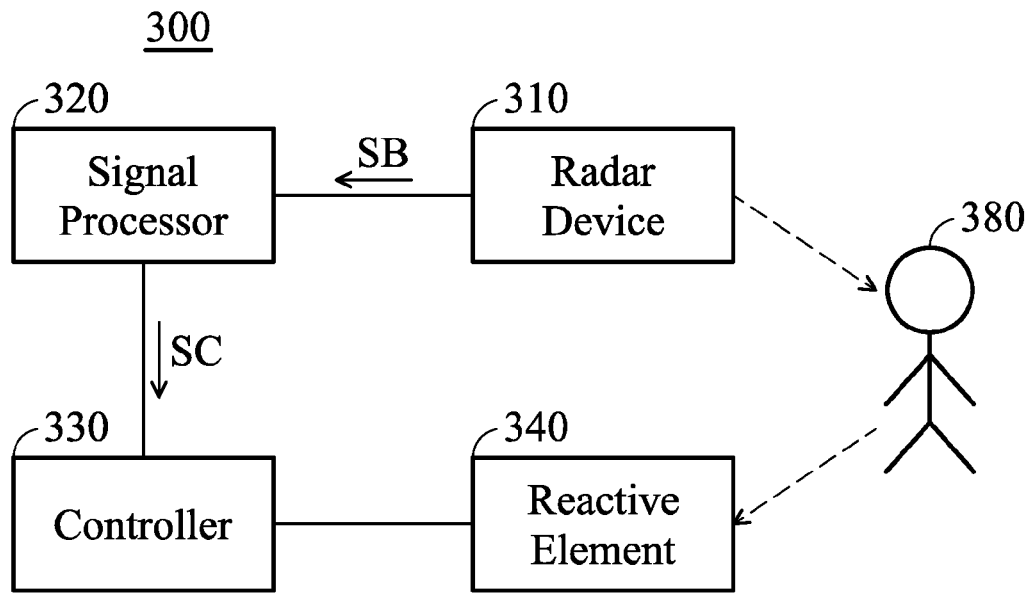
FIG. 3 is a diagram of a security monitoring system according to an embodiment of the subject application.

FIG. 3 is a diagram of a security monitoring system 300 according to an embodiment of the subject application. The security monitoring system 300 can protect a user 380. As shown in FIG. 3, the security monitoring system 300 includes a radar device 310, a signal processor 320, a controller 330, and a reactive element 340. The radar device 310 detects the state of the user 380 (e.g., displacement, speed, or acceleration), and generates a baseband signal SB. The signal processor 320 analyzes the baseband signal SB, and generates a control signal SC. The controller 330 operates the reactive element 340 according to the control signal SC, so as to protect the safety of the user 380.

Figure 4A:
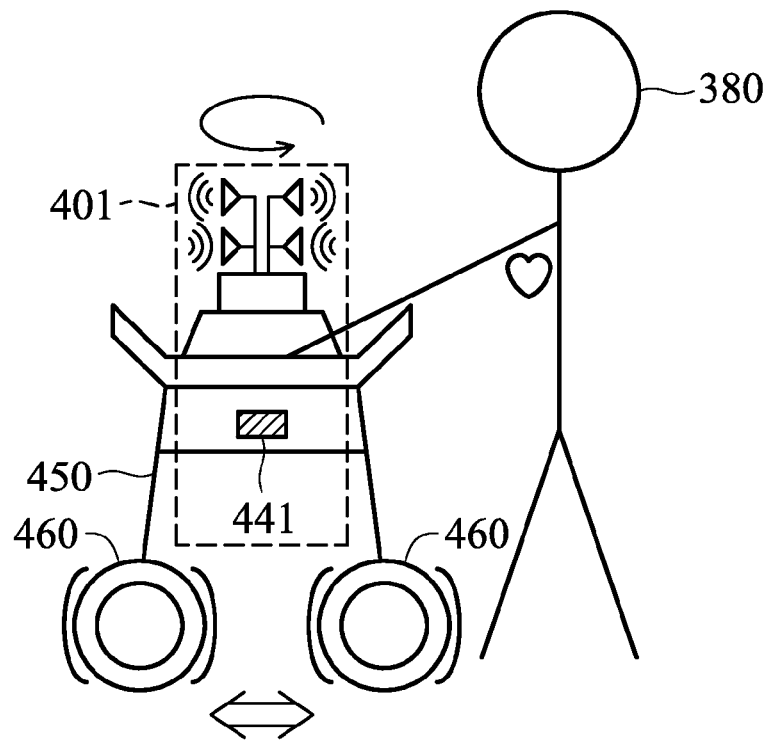
FIG. 4A is a diagram of an application of a security monitoring system according to an embodiment of the subject application.
Figure 4B:
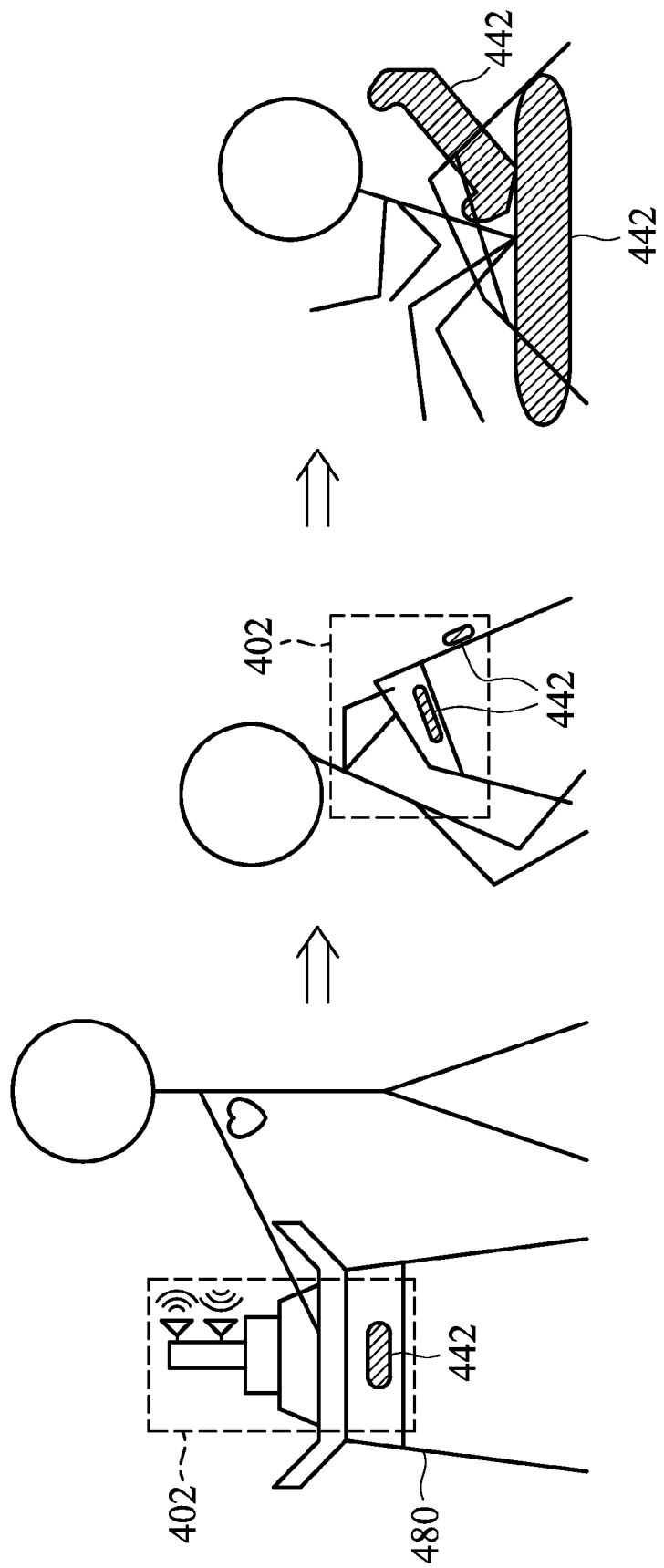
FIG. 4B is a diagram of an application of a security monitoring system according to an embodiment of the subject application.

The following embodiments of FIGS. 4A to 4C describe different configurations of the proposed security monitoring system. It should be understood that these embodiments are merely exemplary, rather than limitations of the subject application.

FIG. 4A is a diagram of an application of a security monitoring system 401 according to an embodiment of the subject application. In the embodiment of FIG. 4A, the security monitoring system 401 is disposed on a walking assistive device 450. The walking assistive device 450 includes multiple wheels 460, and helps a user 380 to move. A reactive element 441 of the security monitoring system 401 is a wheel motor, which is configured to control the rotational state of the wheels 460 of the walking assistive device 450. For example, when the security monitoring system 401 detects that the moving speed of the user 380 decreases, the controller can decrease the rotational speed of the reactive element 441 (i.e., the wheel motor). Conversely, when the security monitoring system 401 detects that the moving speed of the user 380 increases, the controller can increase the rotational speed of the reactive element 441 (i.e., the wheel motor). In other words, the security monitoring system 401 can automatically control the rotational speed of the wheels 460 of the walking assistive device 450 to match the moving speed of the user 380. Such a design can prevent the user 380 from falling due to the improper speed of the walking assistive device 450.

FIG. 4B is a diagram of an application of a security monitoring system 402 according to an embodiment of the subject application. In the embodiment of FIG. 4B, the security monitoring system 402 is disposed on a walking assistive device 480. The walking assistive device 480 may be a device without any wheels, or it may be a device with wheels as shown in FIG. 4A. The walking assistive device 480 helps a user 380 to move. A reactive element 442 of the security monitoring system 402 is an inflatable cushion, which is normally flat. When the security monitoring system 402 detects that the user 380 has fallen (e.g., because the moving speed of the user 380 increased suddenly), the controller can control the reactive element 442 (i.e., the inflatable cushion) to be filled with air immediately, so as to support the user 380. Such a design can prevent the user from being seriously hurt in a fall. In some embodiments, the radar device of the security monitoring system 402 is a light-sensing radar. The light-sensing radar normally transmits light to the user 380 and receives its reflective light therefrom. When the light-sensing radar detects that the reflective light from the user 380 has become weak, it may represent that the user 380 has fallen, and the security monitoring system 402 can immediately fill the reactive element 442 (i.e., the inflatable cushion) with air.

FIG. 4C is a diagram of an application of a security monitoring system 403 according to an embodiment of the subject application. In the embodiment of FIG. 4C, the security monitoring system 403 is disposed on a walking assistive device 480. A reactive element 443 of the security monitoring system 403 is an alarm element. The alarm element normally has no light and no sound. When the security monitoring system 403 detects that the user 380 has fallen, the controller can control the reactive element 443 (i.e., the alarm element) to generate flashing lights and sound. Such a design can inform nearby operators to rescue the fallen user 380.

It should be noted that the radar devices of the embodiments of FIGS. 1A to 1D and FIGS. 2A to 2B may be applied to the security monitoring systems of the embodiments of FIG. 3 and FIGS. 4A to 4C, such that the state of the user (the same as the OUD) can be monitored and controlled. The security monitoring system of the invention can be integrated with a conventional walking assistive device. Such a design can be applied in the elderly-care fields, and configured to protect the life and safety of old and/or disabled people.

The embodiments of the disclosure are considered as exemplary only, not limitations. It will be apparent to those skilled in the art that various modifications and variations can be made in the subject application, the true scope of the disclosed embodiments being indicated by the following claims and their equivalents.

What is claimed is:

1. A radar device for detecting an OUD (Object Under Detection), comprising:
    a signal source, generating an incident signal;
    a first antenna, transmitting the incident signal to the OUD;
    a second antenna, receiving a reflective signal from the OUD;
    a mixer, generating a baseband signal according to the incident signal and the reflective signal; and
    a 90-degree coupler, wherein the second antenna is coupled through the 90-degree coupler to the mixer, or wherein the signal source is coupled through the 90-degree coupler to the first antenna,
    wherein the second antenna is different and separate from the first antenna.

2. The radar device as claimed in claim 1, wherein the radar device is a Doppler radar, and the baseband signal comprises a speed information of the OUD.

3. The radar device as claimed in claim 1, wherein the 90-degree coupler has a first input terminal, a second input terminal, a first output terminal, and a second output terminal, wherein the signals input to the first input terminal or the second input terminal are divided into two portions and are respectively output from the first output terminal and the second output terminal, and wherein a signal phase difference between the first output terminal and the second output terminal is 90 degrees.

4. The radar device as claimed in claim 3, wherein the first input terminal of the 90-degree coupler is coupled to the second antenna, the second input terminal of the 90-degree coupler is coupled through a matching resistor to a ground voltage, and the first output terminal and the second output terminal of the 90-degree coupler are coupled to the mixer.

5. The radar device as claimed in claim 3, wherein the first input terminal and the second input terminal of the 90-degree coupler are coupled to the second antenna, and the first output terminal and the second output terminal of the 90-degree coupler are coupled to the mixer.

6. The radar device as claimed in claim 3, wherein the first input terminal of the 90-degree coupler is coupled to the signal source, the second input terminal of the 90-degree coupler is coupled through a matching resistor to a ground voltage, and the first output terminal and the second output terminal of the 90-degree coupler are coupled to the first antenna.

7. The radar device as claimed in claim 3, wherein the first input terminal and the second input terminal of the 90-degree coupler are coupled to the signal source, and the first output terminal and the second output terminal of the 90-degree coupler are coupled to the first antenna.

8. A radar device for detecting an OUD (Object Under Detection), comprising:
    a signal source, generating an incident signal;
    a first antenna, transmitting the incident signal to the OUD;
    a second antenna, receiving a reflective signal from the OUD; and
    a mixer, generating a baseband signal according to the incident signal and the reflective signal;

wherein the first antenna is a circular polarization antenna and the second antenna is a linear polarization antenna, or wherein the first antenna is a linear polarization antenna and the second antenna is a circular polarization antenna, and wherein the second antenna is different and separate from the first antenna.

9. The radar device as claimed in claim 8, wherein the radar device is a Doppler radar, and the baseband signal comprises a speed information of the OUD.

10. The radar device as claimed in claim 8, wherein signals transmitted or received by the circular polarization antenna have orthogonal polarization directions and phase differences of 90 degrees.

11. The radar device as claimed in claim 8, wherein signals transmitted or received by the linear polarization antenna have orthogonal polarization directions and phase differences of 0 degrees.

12. A security monitoring system for protecting a user, comprising:
   a radar device, detecting a state of the user, and generating a baseband signal;
   a signal processor, analyzing the baseband signal, and generating a control signal;
   a reactive element; and
   a controller, operating the reactive element according to the control signal;
   wherein the radar device comprises:
      a signal source, generating an incident signal;
      a first antenna, transmitting the incident signal to the user;
      a second antenna, receiving a reflective signal from the user; and
      a mixer, generating the baseband signal according to the incident signal and the reflective signal,
   wherein the first antenna is a circular polarization antenna and the second antenna is a linear polarization antenna, or wherein the first antenna is a linear polarization antenna and the second antenna is a circular polarization antenna.

13. The security monitoring system as claimed in claim 12, wherein the reactive element is a wheel motor.

14. The security monitoring system as claimed in claim 13, wherein when it is detected that a moving speed of the user decreases, the controller decreases a rotational speed of the wheel motor, and wherein when it is detected that the moving speed of the user increases, the controller increases the rotational speed of the wheel motor, wherein the user moves with assistance of the wheel motor.

15. The security monitoring system as claimed in claim 12, wherein the reactive element is an inflatable cushion.

16. The security monitoring system as claimed in claim 15, wherein when it is detected that the user has fallen, the controller controls the inflatable cushion to be filled with air immediately, so as to support the user.

17. The security monitoring system as claimed in claim 12, wherein the reactive element is an alarm element.

18. The security monitoring system as claimed in claim 17, wherein when it is detected that the user has fallen, the controller controls the alarm element to generate flashing lights and sound.

* * * * *